M. STEFANSKI.
RESILIENT TIRE.
APPLICATION FILED OCT. 2, 1918.
1,322,070.
Patented Nov. 18, 1919.
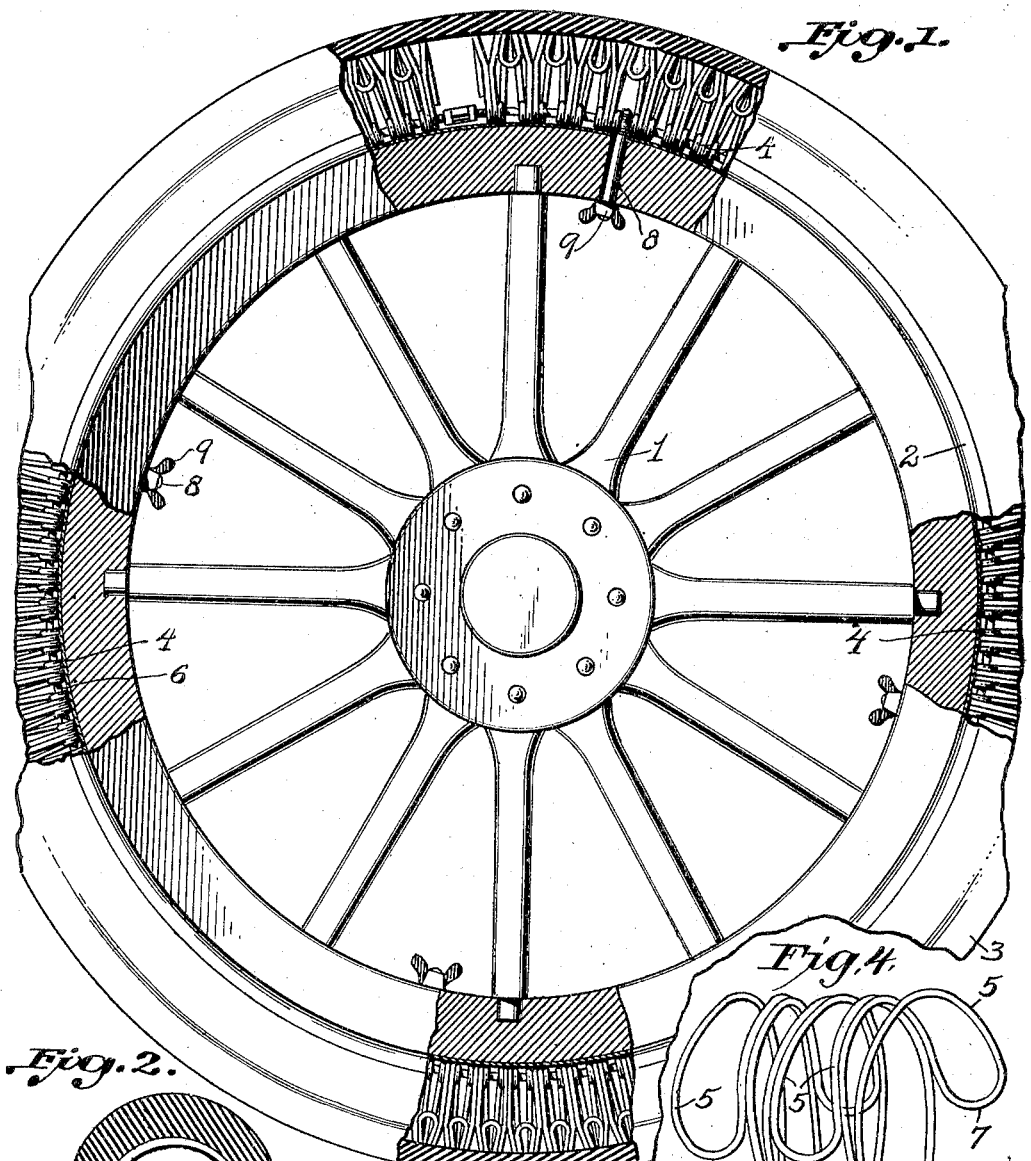
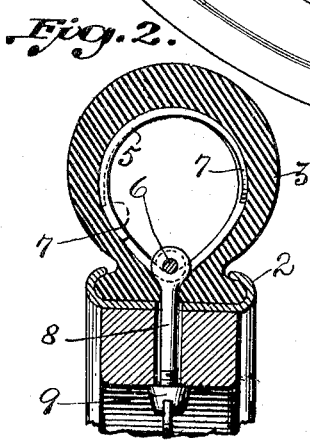
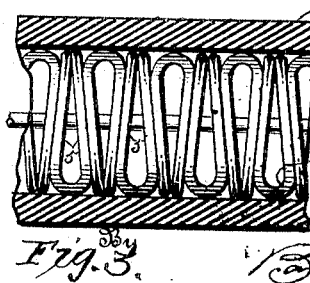
Inventor
Michael Stefanski,
Attorneys

UNITED STATES PATENT OFFICE.

MICHAEL STEFANSKI, OF DETROIT, MICHIGAN.

RESILIENT TIRE.

1,322,070.  Specification of Letters Patent.  Patented Nov. 18, 1919.

Application filed October 2, 1918. Serial No. 256,593.

*To all whom it may concern:*

Be it known that I, MICHAEL STEFANSKI, a citizen of the United States of America, residing at Detroit, in the county of Wayne and State of Michigan, have invented certain new and useful Improvements in Resilient Tires, of which the following is a specification, reference being had therein to the accompanying drawings.

This invention relates to a resilient tire tube replacer or filler wherein a resilient support is obtained for practically the entire extent of the tread surface of the outer tube or casing of the tire.

The invention consists in the matter hereinafter set forth, and more particularly pointed out in the appended claims.

In the drawings,

Figure 1 is a view in side elevation of a wheel and tire therefor provided with a tire tube replacer that embodies features of the invention, parts of the outer casing being broken away and parts being shown in section to give clear view;

Fig. 2 is a view in cross section through the tire, and

Fig. 3 is a plan view of the tread surface of the filler.

Fig. 4 is a fragmentary perspective view of a portion of a coil wire formation.

Referring to the drawing, a wheel 1 of standard construction has the usual rim 2 on which an outer casing 3 may be secured as desired. In place of the inner tude an annulus is formed of spring wire or like resilient material curved to conform generally in cross section to the cross sectional contour of an inflated tube. The wire is bent to form a series of eyelets 4 embracing a retaining wire ring 6 that encircles the rim 2, the wire then being carried into loops 5 having slightly divergent arms connected by flattened end portions 7 so that the end portions of the loops are substantially as resilient as the rest of the device because the flattened thin portions of the wire afford local resiliency. These loops are disposed alternately in opposite directions, the eyelets also being wound in pairs, alternately with right and left hand turns. The wire is in a single piece of sufficient length to extend around the wheel rim.

As a result a very pliant, yielding support is afforded the casing throughout substantially the entire extent of the tread surface. The wider portions of the loop ends fill the spaces between the portions of the coils which contact with the portion constituting the inner face of the tread part of periphery of the casing, which is naturally of greater extent than the inner circumference adjacent the tire rim, so that there is no danger of pinching the casing. The wire ring is shown as anchored in position by suitable means such as bolts 8 extending through the felly and having nuts 9 to retain the bolts in position.

Obviously, changes in the details of construction may be made without departing from the spirit of my invention and I do not care to limit myself to any particular form or arrangement of parts.

What I claim is:—

1. A resilient tire comprising an outer casing adapted to be mounted on a tire rim, a retaining wire ring concentric with the casing and a coiled wire annulus distending the casing and consisting of a continuous spring wire bent into pairs of eyelets through which the ring is threaded, there being elongated loops extending from the pairs of eyelets, the loops being disposed alternately in opposite directions and being longitudinally curved to conform to the casing, the outer bent portions of the loops being flattened to provide resilient tips to the loops.

2. The combination of a tire rim with an outer casing of flexible fabric adapted to be mounted on the rim, a retaining wire ring encircling the rim concentric with the casing, and a coiled wire annulus distending the casing and consisting of a continuous wire bent into pairs of eyelets through which the ring is threaded, and formed between pairs of eyelets into elongated loops extending therefrom, the loops being disposed alternately in opposite directions, and extending past the tread portion, of the casing, the tips of the loops being flattened to provide resilient tips.

3. The combination of a tire rim, with an outer casing of flexible fabric adapted to be mounted on the rim, a retaining wire ring concentric with the casing, and a coiled wire annulus distending the casing and consisting of a continuous spring wire that is bent into pairs of eyelets through which the ring is threaded, the eyelets of each pair being coiled in opposite directions and each pair being connected by an elongated loop conforming longitudinally to the transverse curvature of the casing and extending past the major part of the tread portion thereof, the loops being disposed alternately in opposite directions and the tips of the loops being flattened to provide local resiliency.

In testimony whereof I affix my signature in presence of two witnesses.

MICHAEL STEFANSKI.

Witnesses:
 ANNA M. DORR,
 KARL H. BUTLER.